United States Patent
Bouguet et al.

(10) Patent No.: US 6,219,063 B1
(45) Date of Patent: Apr. 17, 2001

(54) 3D RENDERING

(75) Inventors: Jean-Yves Bouguet; Pietro Perona, both of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/087,128

(22) Filed: May 29, 1998

Related U.S. Application Data

(60) Provisional application No. 60/048,098, filed on May 30, 1997, and provisional application No. 60/052,738, filed on Jul. 7, 1997.

(51) Int. Cl.[7] .................................................. G06T 15/60

(52) U.S. Cl. .......................................... 345/426; 382/154

(58) Field of Search .................................... 345/419, 426, 345/443, 429, 422, 421; 382/154

(56) References Cited

U.S. PATENT DOCUMENTS

| 4,525,858 | * | 6/1985 | Cline et al. | 382/154 |
| 4,653,104 | * | 3/1987 | Tamura | 382/154 |
| 5,832,106 | * | 11/1998 | Kim | 382/154 |
| 5,870,490 | * | 2/1999 | Takahashi et al. | 382/154 |

* cited by examiner

*Primary Examiner*—Mark Zimmerman
*Assistant Examiner*—Kimbinh T. Nguyen
(74) *Attorney, Agent, or Firm*—Fish & Richardson P.C.

(57) ABSTRACT

A technique for capturing the surface of three-dimensional ("3D") objects using structured lighting. The movement of shadow across the 3D objects is optically recorded. Variation in brightness on the surface provides a cue for triangulation. By analyzing the variation in brightness of a particular point on the surface, the location of that point is determined based on the movement of the shadow. With known locations for a camera and a light source, the coordinates in space of the point is triangulated. By repeating this process, a collection of coordinates is created. Those coordinates are then used to reconstruct the 3D surface.

9 Claims, 5 Drawing Sheets

3D RENDERING

This application claims the benefit of the U.S. Provisional Applications No. 60/048,098 filed on May 30, 1997, and No. 60/052,738 filed on Jul. 7, 1997, the entirety of which is incorporated herein by reference.

The United States Government may have certain rights in this invention pursuant to Grant No. EEC 9402726 awarded by the National Science Foundation.

TECHNICAL FIELD

The present disclosure relates to three-dimensional imaging, and more specifically, to the reconstruction of three dimensional surfaces using structured lighting.

BACKGROUND

As the processing speed and memory capacity of computers have continued to increase, along with advances in computer graphics software, the interest in imaging both the geometry and surface texture of three-dimensional ("3D") objects has also increased. Numerous applications of such technology which for many years were anticipated have begun to be realized. The use of 3D representations has expanded in many areas, including entertainment, animation, industrial design, engineering, archiving, commercial advertising, catalogs, and "virtual reality" visits to actual places (e.g., cities and museums).

Various techniques have in turn developed to capture this information. Some are mechanical, some are purely based on images. Each system proposes different tradeoffs. The main parameters to be considered include: cost, accuracy, ease of use, and speed of acquisition. So far most commercial 3D scanners have favored accuracy over other parameters. However, while accurate, these systems tend to be very expensive.

One example of a mechanical system uses physical contact with the object to measure its surface. A robot arm "feels" the object and records the variations in dimension. The object may be rotated or otherwise adjusted to allow for multiple measurements. This type of system is typically expensive, bulky and slow.

Another group of systems uses active lighting, such as a laser or LCD projector. Typically these systems also use motorized transport of the object. The object is lit by projected light and rotated to provide views from multiple angles. While such systems are very accurate, they are also typically very expensive and bulky. Another disadvantage of lasers is that they are potentially dangerous to the operator's eyes, reducing the applicability of these systems to consumer use.

Some computer vision researchers have considered taking a different approach, favoring cost and ease of use while sacrificing some accuracy and speed. A number of ways of obtaining information on 3D shapes from more passively acquired images have long been known: stereoscopic disparity, texture, motion parallax, (de)focus, shading and specularities, occluding contours and other surface discontinuities. Unfortunately, the single passive cue that gives reasonable accuracy, stereoscopic disparity, has two major drawbacks: (a) it requires two cameras, and (b) it is typically ineffective on untextured surfaces. Accordingly, such a system is not inexpensive because of multiple cameras. In addition, because the great majority of industrially manufactured objects do not have textured surfaces, stereoscopic disparity is not suitable for a large number of applications.

The inventors have determined that a better technique for representation is found using shadow rather than lasers or multiple cameras. Accordingly they have developed the methods and apparatus for capturing 3D surfaces based on structured lighting described in the present disclosure.

SUMMARY

The present disclosure describes methods and apparatus providing techniques for capturing the surface of three-dimensional ("3D") objects using structured lighting. The movement of shadow across the 3D objects is optically recorded. Variation in brightness on the surface provides a cue for triangulation. By analyzing the variation in brightness of a particular point on the surface, the location of that point is determined based on the movement of the shadow. With known locations for a camera and a light source, the coordinates in space of the point is triangulated. By repeating this process, a collection of coordinates is created. Those coordinates are then used to reconstruct the 3D surface.

In accordance with one embodiment of the invention a pencil or other object with a straight edge is moved between a light source and a scene of 3D objects. The pencil casts a shadow across a surface of the scene. A camera located below the moving pencil records the scene and shadow. The deformation of the edge of the shadow caused by the contours of the 3D objects is triangulated with calibration information to determine coordinates in space of points on the surface. Those coordinates are then used to reconstruct the 3D surface.

A second embodiment uses a projection of a grayscale pattern upon a scene. A camera records the scene during the projection. The projection is a sinusoidal pattern of brightness. A sequence of frames is projected, each offset from the last, such that the sinusoidal pattern appears to translate across the scene. Thus each point on the scene receives the entire spectrum of brightness contained in the sine wave of the pattern. Using variation in brightness, coordinates of each point in space are determined by triangulation and so the 3D surface is reconstructed.

These and other features and advantages of the techniques disclosed herein will become more apparent in light of the following detailed description of preferred embodiments thereof, as illustrated in the accompanying drawings, and from the claims.

DETAILED DESCRIPTION

The present invention provides a method for capturing the 3D surface of objects using the movement of shadow across the object scene. Variation in brightness on the surface provides a cue for triangulation. By analyzing the variation in brightness of a particular point on the surface, the location of that point is determined based on the movement of the shadow. Based upon known locations of a camera and a light source, depth information for the point is triangulated. That depth information is then used to reconstruct the 3D surface.

A first preferred embodiment uses weak structured lighting, in that an active device such as a laser or LCD projector is preferably not used. The movement of a pencil or other object with a straight edge between a light source and a scene casts a shadow which is recorded by a camera. The deformation of the edge of the shadow cast is triangulated with calibration information to determine the location in space of a point on the surface being scanned. The cumulation of locations in space for all the points on the surface recreates the 3D surface. This embodiment has the advantages of requiring only one camera, minimal human intervention, and minimal extra hardware.

A second preferred embodiment uses a projection of a grayscale pattern upon a scene which is recorded by a camera. The projection is a sinusoidal pattern of varying brightness. A series of frames are projected each offset from the last, such that the sinusoidal pattern appears to translate across the scene. Thus each point on the scene receives the entire spectrum of brightness contained in the sine wave of the projection. Using the variation in brightness, the location of each point in space is determined by triangulation and so the 3D surface is reconstructed. This embodiment is an improvement over previous projection systems in that not as many grayscale patterns need be used compared to earlier binary pattern projections and the effect of a defocussed projector is less detrimental.

Figure 1A:
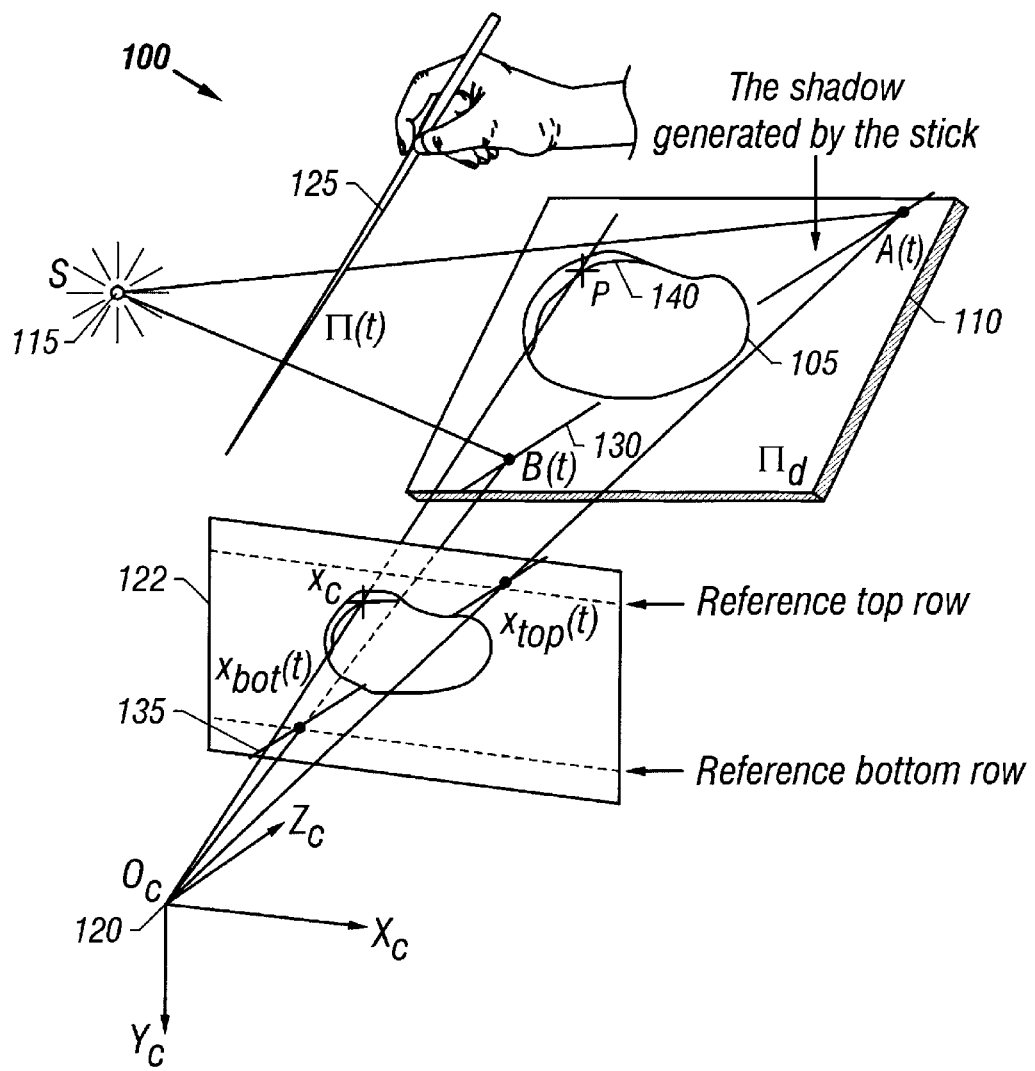
FIG. 1A illustrates a first preferred embodiment of the present invention.

FIG. 1A shows an implementation 100 of the first preferred embodiment. A three-dimensional ("3D") object 105 to be rendered is positioned on a flat surface 110 such as a desktop. Alternatively, more than one 3D object may be positioned on or above flat surface 110. Flat surface 110 forms an object plane for reference in triangulation, described below.

A light source 115, such as a desklamp, projects light onto 3D object 105 and flat surface 110. Light source 115 is preferably approximately a point light source. A desklamp is a sufficient approximation. Accordingly, the entire surface of 3D object 105 is not necessarily illuminated and some portion may be in shadow. In addition, when multiple 3D objects are placed on flat surface 110, one or more of the 3D objects may be occluded by another 3D object and not be exposed to light source 115. Objects or portions of objects which are not exposed to light source 115 are not rendered. Additional renderings with light source 115 at different positions may be performed to render 3D objects and portions of 3D objects previously occluded.

A camera 120 optically records an image 122 of the scene. In addition, camera 120 is preferably connected to a desktop computer (not shown). The computer performs the calculations necessary for triangulation to render the coordinates of the surface points of the surface of 3D object 105.

A shadow object 125 which has a straight edge, such as a rod or pencil, is positioned between light source 115 and 3D object 105 such that a vertical shadow 130 is cast across 3D object 105 and flat surface 110. Pencil 125 is preferably held in the operator's hand above camera 120 so as not to obscure 3D object 105 from camera 120. Shadow 130 appears as a generally vertical bar 135 in camera image 122. The operator then moves pencil 125 such that shadow 130 cast by pencil 125 translates across the scene, preferably horizontally from left to right.

Camera 120 records a sequence of images 122 showing the movement of shadow 130 cast by pencil 120. An edge 140 of shadow 130 is deformed by the variations in depth of the surface of 3D object 105. If the scene were merely flat surface 110, and hence a flat plane, shadow edge 140 would be a straight vertical line. Variation in depth, caused by the three-dimensional nature of 3D object 105 in the scene, deforms shadow edge 140. This deformation provides the information used to triangulate the coordinates in space of each point in image 122.

Each image 122 recorded by camera 120 of the scene is divided into pixels $x_c$. Each pixel $x_c$ has a corresponding point P in space upon the surface of 3D object 105 for the portion of 3D object 105 shown by that pixel $x_c$. This correlation indicates an optical ray ($O_c$, $x_c$) for each pixel $x_c$ in camera image 122. Each optical ray ($O_c$, $x_c$) begins at the location $O_c$ of camera 120 in space (approximated based upon the camera calibration described below) and passes through camera image 122 at pixel $x_c$ and then through point P.

Using portions of shadow edge 140 which fall across only flat surface 110, not 3D object 105, a shadow plane is found which coincides with shadow edge 140 at point P and light source 110. Point P is at the intersection of optical ray ($O_c$, $x_c$) and the shadow plane corresponding to point P. This intersection is found by triangulation. By repeating this process for all pixels $x_c$ in camera image 122, the surface of 3D object 105 is reconstructed. This process is described in more detail below.

Figures 2, 3:
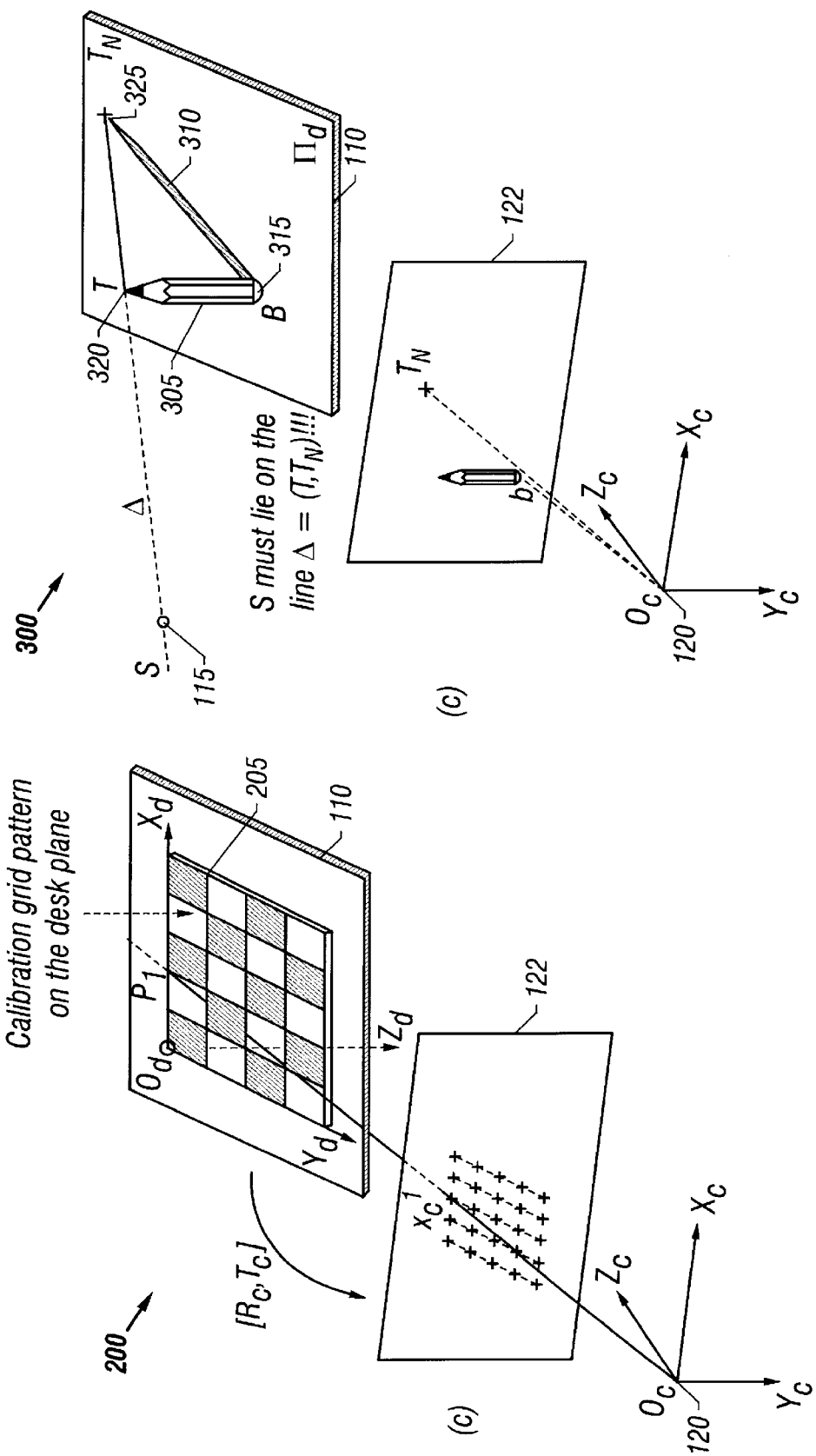
FIG. 2 illustrates a preferred technique of camera calibration.
FIG. 3 illustrates a preferred technique of light source calibration.

However, preferably before 3D object 105 is placed upon flat surface 110, camera 120 and light source 115 are calibrated. FIG. 2 shows a configuration 200 and technique for calibrating camera 120. This technique is described in detail by R. Y. Tsai in "A Versatile Camera Calibration Technique for High Accuracy 3D Machine Vision Metrology Using Off-the-Shelf TV Camera and Lenses", in *IEEE Journal Robotics Automat.*, RA-3(4):323–344, 1987, the disclosure of which is herein incorporated by reference. An object 205 of known geometry such as a checkerboard is placed on flat surface 110 forming a calibration plane. Camera image 122 and the known geometry of checkerboard 205 are compared using known calibration algorithms. Intrinsic parameters of camera 120 and extrinsic parameters attached to the relative position of camera 120 with respect to flat surface 110 are found. Intrinsic parameters of camera 120 include focal length, optical center, and radial distortion factor. Extrinsic parameters so determined include the location $O_c$ of camera 120 and the coordinates of object plane $\Pi_d$ coinciding with flat surface 110.

FIG. 3 illustrates a preferred configuration 300 and technique for calibrating light source 115 to find the coordinates of a point S in space for light source 115. First the operator places (or holds in place) a calibration object 305 of known length on flat surface 110, orthogonal to the plane of flat surface 110. Calibration object 305 may be the same pencil 125 described above with respect to rendering in FIG. 1A. Camera 120 records a shadow 310 cast by pencil 305 upon flat surface 110. Points B and T in space represent a base 315 and a tip 320 of pencil 305. A tip 325 of shadow 310 cast by pencil 305 is represented by point $T_s$. Points B and $T_s$ are located on plane $\Pi_d$.

To calculate points B and $T_s$, the intersections of optical rays extending from camera 120 through points B and $T_s$ with plane $\Pi_d$ are found. Pixels b and $t_s$ in camera image 122 correspond to points B and $T_s$, respectively. Where $O_c$ is the location of camera 120, the coordinates of point $T_s$ are at the intersection of an optical ray ($O_c$, $t_s$) and the plane $\Pi_d$. Coordinates for point B are found in the same way. Coordinates for point T representing tip 320 of pencil 305 are then readily calculable because the length of pencil 305 and base coordinates B are now known, and pencil 305 is orthogonal to plane $\Pi_d$.

Accordingly, point S lies on a line L1 in space with the two points T and $T_s$ because a straight line can always be drawn from a point light source through an edge of an illuminated object to a corresponding edge of a shadow cast by that light source. This process is repeated with pencil 305 at a different location on flat surface 110, indicating a second line L2. The point S is located at an intersection of the two lines L1 and L2. While light source 115 is not necessarily a true point light source, an approximation of light source 115 as a point light source is acceptable.

Repeating this light source calibration process multiple times results in increased accuracy as to an approximation of the point S. By integrating all the lines found in this way in a unique linear estimation problem, such as in a least squares form, the estimation becomes increasingly more stable.

This light source calibration process is very simple and easily repeatable. Thus, the operator may move light source 115 (without moving camera 120 or 3D object 105) and recalibrate light source 115 quite simply. As a result, multiple renderings of 3D object 105 may be made with light source 115 at different locations. Multiple renderings improve the information captured about the surface of 3D object 105 because occluding contours are circumvented.

Figure 1B:
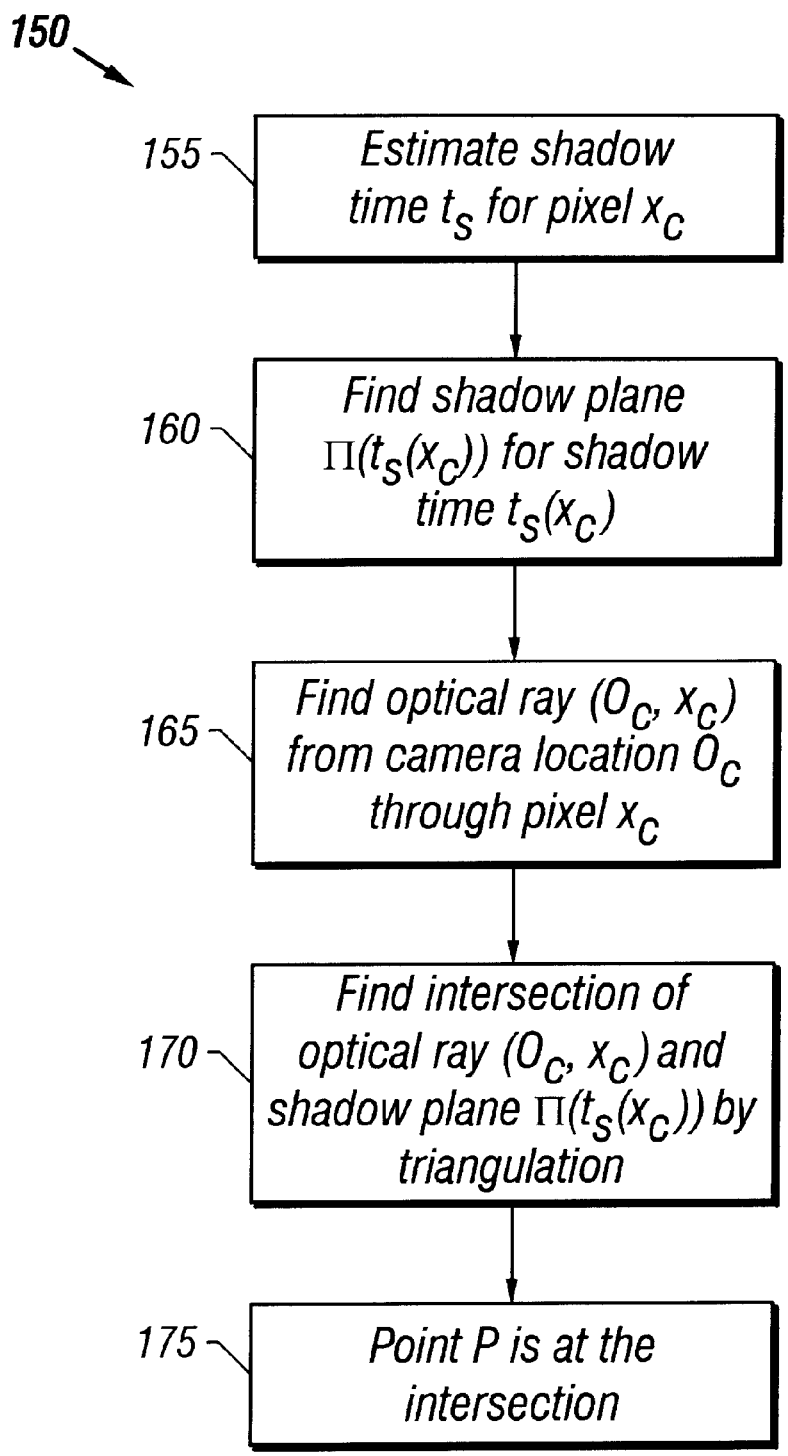
FIG. 1B is a flowchart of a preferred technique of the first preferred embodiment.

Returning to FIG. 1A and the rendering process, the process for calculating shadow edge 140 will be described in more detail with reference to FIG. 1B. FIG. 1B is a flowchart of a preferred technique 150 to find point P. A time for each pixel $x_c$ when shadow edge 140 passes through that pixel $x_c$ is found in step 155. This time is referred to as the shadow time for that pixel. Thus, each pixel $x_c$ has a shadow time $t_s(x_c)$. Each shadow time $t_s(x_c)$ has an associated shadow plane $\Pi(t_s(x_c))$ found in step 160. The shadow plane for a shadow time is the plane formed by point S representing light source 115 and points upon object plane $\Pi_d$ where shadow edge 140 lies at that time $t_s(x_c)$. When a shadow plane has been determined for each shadow time, then each pixel $x_c$ has an associated shadow plane $\Pi(t_s(x_c))$ through its associated shadow time $t_s(x_c)$. Each pixel $x_c$ also has an associated optical ray $(O_c, x_c)$ which begins at the location $O_c$ of camera 120 and passes through both pixel $x_c$ and point P. Optical ray $(O_c, x_c)$ is found in step 165. The intersection of optical ray $(O_c, x_c)$ and the associated shadow plane $\Pi(t_s(x_c))$ is found by triangulation in step 170. This intersection is the location in space of point P in step 175. The order of steps shown in FIG. 1B is preferred, but may vary in alternative implementations. For example, the shadow planes may be found independently of estimating the shadow times. Similarly, the shadow times for all pixels may be determined before any shadow planes are found. The shadow time for a pixel and the shadow plane for a particular time are used in conjunction to indicate a shadow place for the pixel. Thus, both the shadow time and the shadow plane are preferably found before the intersection is found.

Hence, the determination of the coordinates in space of the point P depends upon spatial and temporal searching. Spatially, the shadow planes $\Pi(t)$ for all times t are estimated (step 160). Temporally, the shadow time $t_s$ for each pixel $x_c$ is estimated (step 155). The two searches are preferably compatible. That is, both result in the same point P for a particular time t and pixel $x_c$. This compatibility is not true for all techniques, such as with an image gradient approach for edge detection like the edge detector described by J. F. Canny in "A Computational Approach to Edge Detection", *IEEE Transactions on Pattern Analysis and Machine Intelligence*, 8(6):679–698, 1986. In particular it is desirable to avoid the effects of spatial filtering (e.g., smoothing or gradient computations).

Thus, a unified quantity describing shadow edges in space (i.e., image coordinates) and time is preferred. The preferred technique is a spatio-temporal thresholding and achieves this unified quantity.

In step 160, to determine the shadow plane $\Pi(t)$ for a time t the location of shadow edge 140 on object plane $\Pi_d$ is used. Two points A and B are found which are on plane $\Pi_d$ and on shadow edge 140 at time t. Hence points A and B are dependent on time as they represent two points on object plane $\Pi_d$ where shadow edge 140 is cast at time t.

Points A and B are found using a spatial shadow boundary search. Assuming 3D object 105 does not occlude flat surface 110 in the extreme top and bottom regions of image 122, two reference rows $R_{top}$ and $R_{bottom}$ are selected in image 122. For each time t, $R_{top}$ is searched for a pixel $x_{top}(t)$ which is on shadow edge 140. $x_{top}(t)$ is found by comparing the brightness of each pixel in $R_{top}$ at time t to the mean of a maximum brightness and minimum brightness, as described in more detail below. $x_{top}(t)$ is the pixel where the brightness falls below that mean. A similar process is performed for $R_{bottom}$ to find a pixel $x_{bottom}(t)$. Pixels $x_{top}(t)$ and $x_{bottom}(t)$ correspond to points A and B, respectively. Thus, points A and B are at the intersection of plane $\Pi_d$ and respective optical rays formed by point $O_c$ representing the location of camera 120 and pixels $x_{top}(t)$ and $x_{bottom}(t)$ The shadow plane $\Pi(t)$ is then determined using the three known points A, B, and S representing the location of light source 115. This process is repeated for each unit of time t, where each unit of time t represents an image recorded by camera 120. t ranges from 0 to i–1, where i is the number of images recorded by camera 120. Thus, one shadow plane $\Pi(t)$ is found for each recorded image forming a list of i shadow planes $\Pi(t)$.

In step 155, to determine the shadow time $t_s$ for a pixel $x_c$, a brightness I of that pixel is analyzed. Each pixel's brightness I varies from a maximum brightness $I_{max}$ (e.g., no shadow) to a minimum brightness $I_{min}$ (e.g., in shadow) and back to $I_{max}$. The shadow time $t_s$ is when the brightness I crosses an arithmetic mean of $I_{max}$ and $I_{min}$. This mean is a brightness $I_{shadow}$. $I_{shadow}$ is potentially different for every pixel. The resulting shadow time $t_s$ is not necessarily an integer value because the brightness I may cross the mean brightness $I_{shadow}$ between frames. Use of the minimum and maximum brightness to determine the shadow time accommodates interflections (i.e., light reflected from other objects in the scene). Each pixel may have a minimum brightness which is not zero due to interflections, and there is not necessarily a uniform minimum brightness throughout the image. Accordingly, the mean $I_{shadow}$ of $I_{max}$ and $I_{min}$ is used. The shadow time $t_s$ serves as an index into the list of shadow planes $\Pi(t)$ found above, described in more detail below.

Accordingly, shadow edge 140 may be found spatially or temporally. Shadow edge 140 is at points where the brightness I(x,y,t) for a pixel at coordinates (x,y) at a given time t equals the mean brightness $I_{shadow}(x,y)$ for that pixel. By setting the time t as a constant, the search for the shadow edge is in terms of image coordinates x and y, a spatial search. Similarly, by setting x and y to be constant, a temporal search in terms of t can be performed.

Some pixels are occluded and provide no depth information. Reliable information is available primarily for those pixels which have enough "swing" in brightness between minimum and maximum values. A pixel's contrast $I_{contrast}$ is the difference between the maximum brightness $I_{max}$ and minimum brightness $I_{min}$ for that pixel. Accordingly, a threshold value is set where pixels which have a contrast $I_{contrast}$ below that threshold are not processed.

An alternate "memoryless" procedure can be used where all the image sequences need not be stored. Instead, only the minimum min and maximum $I_{max}$ brightness values are maintained. As brightness values are processed, a lower value replaces the minimum $I_{min}$. Once the brightness at a pixel begins to rise, the last value remains the minimum. Thus, $I_{min}$ and $I_{max}$ are available. The mean $I_{shadow}$ is then computed and the shadow time can be determined when the brightness crosses the mean $I_{shadow}$. This would track the left (trailing) edge of the shadow rather than the right (leading) edge (assuming the pencil is moving from left to right).

Once a shadow time $t_s(x_c)$ has been determined for each pixel $x_c$ and a shadow plane $\Pi(t)$ for each time t, a shadow plane $\Pi(t_s(x_c))$ for each pixel $x_c$ is found. If shadow time $t_s(x_c)$ is an integer value, shadow plane $\Pi(t_s(x_c))$ is a shadow plane $\Pi(t)$ where $t=t_s(x_c)$. If shadow time $t_s(x_c)$ is not an integer value, shadow plane $\Pi(t_s(x_c))$ is a plane between shadow planes $\Pi(t_o)$ and $\Pi(t_{o+1})$. Two times $t_o$ and $t_{o+1}$ are found where $t_o$ is the largest integer smaller than $t_s(x_c)$ and $t_{o+1}$ is the smallest integer larger than $t_s(x_c)$, such that $t_o < t_s(x_c) < t_{o+1}$. $\Pi(t_s(x_c))$ is found by linear interpolation between shadow planes $\Pi(t_o)$ and $\Pi(t_{o+1})$. Thus, every pixel $x_c$ has a corresponding shadow plane $\Pi(t_s(x_c))$.

The location of point P in space is determined by triangulation in step 170. Thus, point P is at the intersection of optical ray $(O_c, x_c)$ and shadow plane $\Pi(t_s(x_c))$.

As each point P is generated for each pixel $x_c$, a cloud of points is developed. This cloud of points provides the information which is the reconstruction of the 3D surface of the scene. This embodiment produces a high density of data points because scene depth is calculated for every pixel in the image, leading to an improved reconstruction. A mesh may be generated by connecting neighboring points in triangles, and displayed in a graphics environment. Thus, every vertex in the mesh corresponds to a pixel with a corresponding brightness.

The quality of data recovered depends upon the horizontal speed of the pencil as it is moved across the scene. Thus, the operator is free to move the pencil at any speed. By varying the speed of the pencil movement, the operator selects the level of detail desired in the representation. If the speed is varied during a single pass, e.g., slower over some portions of the scene than other portions, those portions where the pencil was moved more slowly will be more accurately represented in the reconstruction. Thus, the operator may provide a more detailed representation of areas of the scene which are of more interest by moving the pencil more slowly over such areas.

The first embodiment presents significant advantages over the conventional methods of scanning 3D objects. The equipment necessary is very simple and easy to use. As a result, the cost of the system is very low relative to active lighting systems. The ease of use and low cost make this system well suited to a broader range of applications, notably consumer use.

Figure 4:
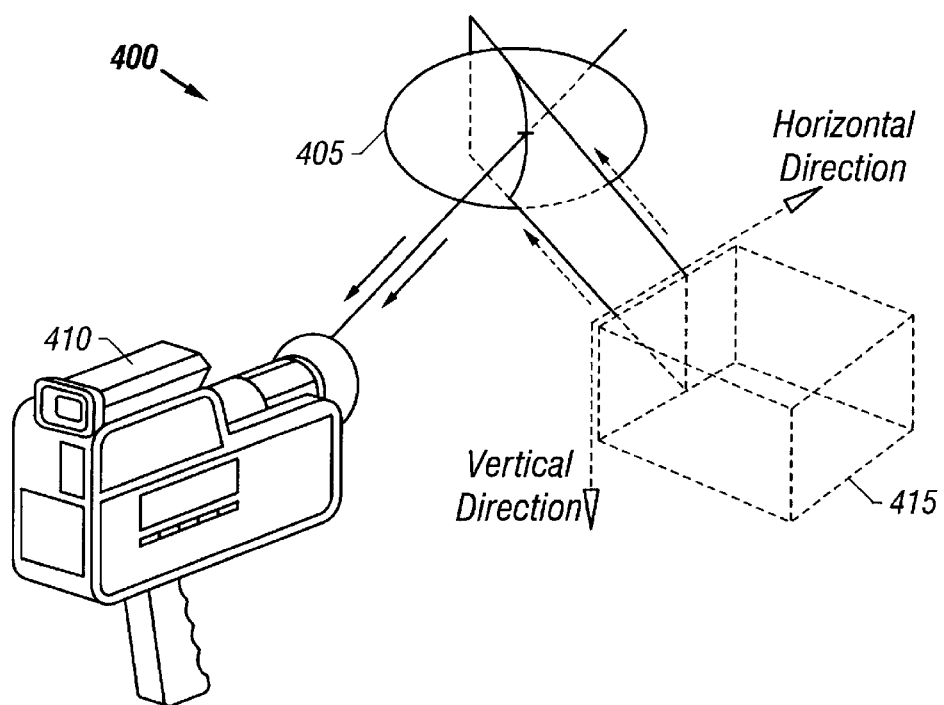
FIG. 4 illustrates a second preferred embodiment of the present invention.

FIG. 4 shows an implementation 400 of the second preferred embodiment. A 3D object 405 is positioned before a camera 410 and a projector 415. As in the first embodiment, more than one 3D object may be rendered at a time. In addition, camera 410 is preferably connected to a desktop computer (not shown). The computer performs the calculations necessary for triangulation to render the coordinates of the surface points of the surface of 3D object 405.

Projector 415 projects a series of grayscale patterns upon 3D object 405 to be recorded by camera 410. Projector 415 is preferably a LCD projector, but alternatively a motorized filter sliding in front of a lamp or a neon lamp appropriately controlled may also be used. Preferably, one image is recorded for each projected pattern. Varying brightness of the patterns upon 3D object 405 provides information useful to triangulate coordinates in space of points on the surface of 3D object 405.

Each grayscale pattern is a pattern of varying brightness such that the brightness varies horizontally preferably in accordance with a sine wave. The fineness of the gradation in the grayscale determines the fineness of the resolution. A coarser gradation renders a less exact representation of 3D object 405. The pattern is uniform vertically. Each pattern is horizontally phase-shifted a constant amount from the previous pattern. The first and last patterns in the sequence are preferably offset by the same amount as the other patterns in the sequence, but not necessarily. In this way, as the patterns are projected in sequence the sinusoidal grayscale pattern appears to translate across 3D object 405. Alternatively, the horizontal and vertical orientations described above may be reversed.

Figure 5:
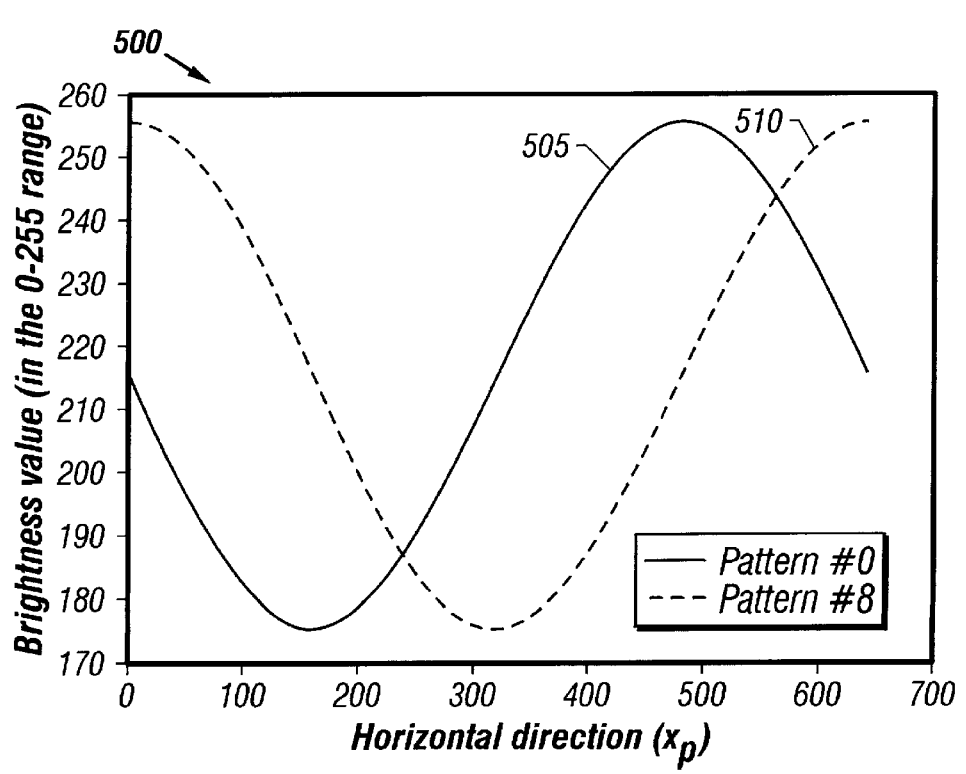
FIG. 5 is a graph of preferred sinusoidal brightness patterns.

FIG. 5 is a graph 500 of sine wave patterns 505 and 510 of brightness for two patterns. Pattern 510 is offset from pattern 505, but is otherwise the same sinusoidal pattern. In an alternative embodiment, the patterns are not sinusoidal but some other waveform such as a triangular wave.

Figure 6:
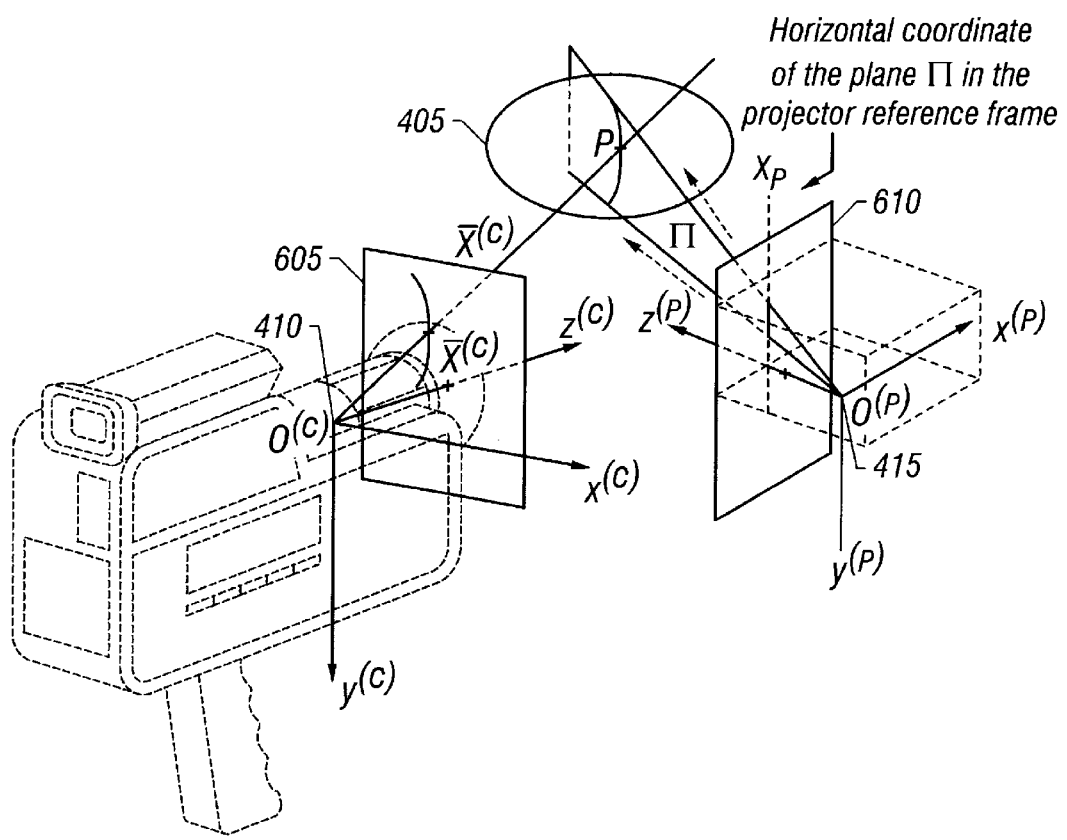
FIG. 6 further illustrates the second preferred embodiment of the present invention.

FIG. 6 illustrates a technique for determining the location of a point on the surface of 3D object 405. Each pixel $x_c$ in an image 605 recorded by camera 410 sees a point P on 3D object 405. Each point P is illuminated by a sinusoidal wave of brightness from projector 415. The sine wave for each point is phase-shifted relative to that of the projected patterns because each point on the surface of 3D object 405 is offset some horizontal distance. Accordingly, this phase shift is used to estimate a horizontal coordinate $x_p$ of point P in an image 610 of projector 415. A projection plane $\Pi$ is derived from horizontal coordinate $x_p$ and the known projector location $O_p$. Point P lies on an optical ray $(O_c, x_c)$ originating at the known location $O_c$ of camera 410 and passing through pixel $x_c$ corresponding to point P. Thus, the location in space of point P is at the intersection of plane $\Pi$ and optical ray $(O_c, x_c)$, found by triangulation.

Similar to the first embodiment, camera 410 and projector 415 are calibrated to derive intrinsic and extrinsic parameters. Camera 410 is preferably calibrated in the same manner as described above with reference to the article by Tsai using a grid pattern, such as a checkerboard, placed on a supporting plane. This camera calibration reveals the intrinsic parameters of camera 410 as well as the location of the supporting plane. To calibrate projector 415, the grid pattern is removed without moving the supporting plane. Projector 415 projects a second grid pattern onto the supporting plane and is calibrated based on the image recorded by camera 410 using the same algorithms described by Tsai. This projector calibration reveals the intrinsic parameters of projector 415 as well as the location of projector 415 with respect to the supporting plane. The relative positions of camera 410 and projector 415 are then derived.

More particularly, to derive the phase shift of the brightness waveform, the horizontal point $x_p$ in projector image 610 is estimated. Each waveform for each point has a different phase $\Phi$, amplitude A, and offset B. Let I(n) be a function for brightness at pixel $x_c$ in camera image 605 and n be the ordinal number of the pattern out of N total patterns (ranging from 0 to N−1) such that:

$$I(n) = A \sin(\omega_0 n - \Phi) + B \tag{1}$$

where the frequency $\omega_0$ is given by $$\omega_0 = 2\pi/N \tag{2}$$

Given a single period sinusoidal waveform, there is a linear relationship between the phase $\Phi$ and the projector horizontal coordinate $x_p$:

$$x_p = N_p \Phi / 2\pi \tag{3}$$

where $N_p$ is the width in pixels of the projector image. Accordingly, estimating $x_p$ at each pixel $x_c$ is equivalent to estimating the phase shift $\Phi$ of the associated brightness function I(n).

Equations for horizontal projector coordinate $x_p$ and amplitude A are derived for a pixel $x_c$ with a particular brightness function I(n) such that:

$$x_p = \frac{N_p}{2\pi} \arctan\left(-\frac{\langle I(n), \cos(\omega_0 n)\rangle}{\langle I(n), \sin(\omega_0 n)\rangle}\right) \quad (4)$$

$$A = \sqrt{\langle I(n), \sin(\omega_0 n)\rangle^2 + \langle I(n), \cos(\omega_0 n)\rangle^2} \quad (5)$$

"<,>" denotes the standard inner product. For example, $$\langle I(n), \cos(\omega_0 n)\rangle = \sum_{n=0}^{N} I(n) \cos(\omega_0 n) \quad (6)$$

Where the amplitude A is low the phase estimation is less reliable. Amplitude A tends to have low values where the point on the surface is in shadow, dark, or nonreflective. By using a threshold value, processing is only done on those pixels which have an amplitude A above that threshold. A series of values for $x_p$ are then generated for those pixels $x_c$ with sufficiently large amplitude A.

Thus, for each pixel $x_c$ a plane Π is generated which corresponds to the vertical band of the projected pattern at $x_p$ and the location $O_p$ of projector 415. Then by triangulation with optical ray ($O_c$, $x_c$) and plane Π, the location in space of the point P is found.

As in the first embodiment a cloud of data points are then generated by finding coordinates for each point P corresponding to each pixel $x_c$. The data points may be combined to form a mesh. This mesh then represents the reconstruction of the 3D surface.

The second embodiment described has advantages over prior art techniques which projected binary stripe patterns. The use of grayscale patterns rather than binary stripe patterns produces superior results. Because the edge of a solid area is not being used, the effects of a defocussed projector are limited. Lack of a clear projection will be consistently represented throughout the grayscale patterns and will not affect the calculations of phase shift. In addition, less grayscale patterns are necessary than with conventional binary stripe patterns and so this embodiment generates reconstructions more rapidly. However, in an alternative implementation, a combination of grayscale and binary stripes or waveforms of higher frequencies may be used.

These variations and other modifications are intended to be encompassed by the following claims.

What is claimed is:

1. A method for creating a representation of a surface of at least one three-dimensional object above an object plane, comprising:
   projecting a light beam;
   using an object to create at least one shadow across the surface and the object plane at any of a plurality of different random locations;
   optically recording each shadow and the surface; and
   calculating coordinates of spatial points by triangulation to represent surface points on the surface.

2. The method of claim 1 where said calculating a coordinate of a spatial point by triangulation to represent a surface point includes:
   calculating a shadow plane formed by the source of the projecting and the intersection of a shadow and the object plane; and
   calculating an intersection point between the shadow plane and a line extending from the source of the recording through the surface point, where the intersection point is the coordinate of the spatial point.

3. The method of claim 1 where said projecting at least one shadow across the surface includes moving an object with a straight edge between a light source and the surface in a way that a shadow projected by the straight edge passes across the surface.

4. The method of claim 1 further comprising:
   optically recording a calibration plane of known geometry;
   optically recording a shadow cast by a calibration object of known length; and
   calculating coordinates of spatial points by triangulation to represent the locations of the object plane, the source of the projecting, and the source of the recording based upon the optical recordings of the calibration plane and the calibration object.

5. The method of claim 1 where said projecting at least one shadow across the surface includes projecting a sequence of patterns upon the surface where each pattern is a sine wave of brightness.

6. The method of claim 5 where the first pattern in the sequence is offset by an initial constant amount from the last pattern in the sequence, and each remaining pattern in the sequence of patterns is offset by a sequential constant amount from an immediately preceding pattern in the sequence.

7. The method of claim 5 where said calculating by triangulation includes estimating a phase-shift of a local brightness pattern at the surface point relative to the sequence of patterns projected upon the surface.

8. A system for creating a representation of a surface of at least one three-dimensional object, the system comprising:
   a flat surface;
   a light source for projecting light onto at least one surface;
   a shadow object with a straight edge for protecting a shadow across each surface which has light projected thereon by the light source, said shadow object being held at any of a plurality of different random locations at a spot between said light source and said three dimensional object;
   a camera for optically recording each shadow and each surface; and
   a computer programmed and operated to calculate points in space to represent the surface by triangulation.

9. The system of claim 8 further comprising:
   a calibration plane of known geometry for calibrating the camera; and
   a calibration object of known length for calibrating the light source.

* * * * *